United States Patent
Alanyali et al.

(10) Patent No.: US 6,304,349 B1
(45) Date of Patent: Oct. 16, 2001

(54) WDM OPTICAL COMMUNICATIONS NETWORKS AND METHODS FOR PROVISIONING

(75) Inventors: Murat Alanyali, Bilkent (TR); Ender Ayanoglu, Red Bank, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/109,250

(22) Filed: Jun. 30, 1998

(51) Int. Cl.$^7$ .......................... H04B 10/00; H04B 10/12
(52) U.S. Cl. ..................... 359/127; 359/110; 359/128; 359/117
(58) Field of Search ...................... 359/110, 117, 359/127, 128, 165; 370/238, 60; 709/241

(56) References Cited

U.S. PATENT DOCUMENTS

| 5,088,032 | * | 2/1992 | Bosak | 359/200 |
| 5,485,455 | * | 1/1996 | Dobbins | 370/60 |
| 5,835,482 | * | 11/1998 | Allen | 370/225 |

OTHER PUBLICATIONS

Bertsekas, D. and R. Gallager, Data Networks, Prentice–Hall, New Jersey, 1992, e.g., at Problem 5.31.

Alexander, S.B., et al, "A precompetitive consortium on wide–band all–optical networks," J. of Lightwave Tech., vol. 11, pp714–735, May, 1993.

Chang, G.K., et al, "Multiwavelength reconfigurable WDM/ATM/SONET network testbed," J. of Lightwave Tech., vol. 14, pp. 1320–1340, Jun., 1996.

Wagner, R.E., et al, "MONET: Multiwavelength optical networking," IEEE J. of Lightwave Tech., vol. 14, pp. 1349–1355, Jun., 1996.

(List continued on next page.)

Primary Examiner—Jason Chan
Assistant Examiner—Agustin Bello
(74) Attorney, Agent, or Firm—William Ryan (57) ABSTRACT

Methods for provisioning optical communications networks employing wavelength division multiplexing (WDM) technology provide for routing and wave-length assignment of a set of connection requests. Avoiding many of the pitfalls of exactly optimum solutions, the present heuristic methods provide much shorter execution times while providing near-optimum performance. Adaptations of the basic solutions provide design of restorable networks capable of handling a specified set of failures. This approach advantageously is based on considering all failures simultaneously, and performs better than solutions in which independent designs are developed for each failure. Networks designed using these methods store configuration information for primary network configurations and for one or more restoration networks. Upon startup or upon network failures, predetermined configuration directions are applied to wavelength selective cross-connects (WSXC) at each network node to establish (or reestablish) desired network node interconnections.

8 Claims, 4 Drawing Sheets

OTHER PUBLICATIONS

Nagatsu, N., and K. Sato, "Optical path accommodation design enabling cross–connect system scale evaluation," IEICE Trans. Commun., vol. E78–B, No. 9, pp. 1339–1343, Sep., 1995.

Jeong, G and E. Ayanoglu, "Comparison of wavelength–interchanging and wavelength–selective cross–connects in multiwavelength all–optical networks," Proc. IEEE INFOCOM '96, pp. 156–163, Mar., 1996.

Bhattacharya, S, "Optimal multihop routing. An iterative approach to TWDM embedding", 20th Conference on Local Computer Networks, Oct. 16–19, 1995, pp. 92–101.*

Ganz, A., "Reconfigurability of multi–star based lightwave LANs", Global Telecommunications Conference, Conference Record., GLOBECOM '92. Communication for Global Users., IEEE, Dec. 6–9, 1992, pp. 1906–1910.*

Aboelela, E., "Routing in multimetric networks using a fuzzy link cost", Second IEEE Symposium on Computers and Communications, 1997. Proceedings, Jul. 1–3, 1997, pp. 397–401.*

Mouldin, R., "A new path metric for survivable circuit switched routing", Military Communications Conference, 1989. MILCOM '89. Conference Record. Bridging the Gap. Interoperability, Survivability, Security., 1989 IEEE, Oct. 15–18, 1989, pp. 0688–0692.*

Alanyali, M, "Provisioning algorithms for WDM optical networks", INFOCOM '98. Seventeenth Annual Joint Conference of the IEEE Computer and Communications Societies. Proceedings. IEEE, Mar. 29–Apr. 2, 1998, pp. 910–918.*

Busche, M.T, "Network architecture for critical communications requirements", Military Communications Conference, 1993. MILCOM '93. Conference record. Communications on the Move., IEEE, Oct. 11–14, 1993, pp. 133–139.*

* cited by examiner

WDM OPTICAL COMMUNICATIONS NETWORKS AND METHODS FOR PROVISIONING

FIELD OF THE INVENTION

The present invention relates to high capacity communications networks, and more particularly to optical communications networks interconnecting geographically distributed nodes. Still more particularly, the present invention relates to such networks using very high capacity wavelength division multiplexing (WDM) technology.

BACKGROUND OF THE INVENTION

Transport networks are wide area networks that provide connectivity for aggregated traffic streams. Modern transport networks increasingly employ wavelength division multiplexing (WDM) technology to utilize the vast transmission bandwidth of optical fiber. WDM is based on transmission of data over separate wavelength channels on each fiber. Presently, WDM is mainly employed as a point-to-point transmission technology. In such networks, optical signals on each wavelength are converted to electrical signals at each network node. On the other hand, WDM optical networking technology, which has been developed within the last decade, and which is becoming commercially available employs wavelengths on an end-to-end basis, without electrical conversion in the network. See, for example, Alexander, S. B., et al, "A precompetitive consortium on wide-band all-optical networks," *J. of Lightwave Tech.,* Vol. 11, pp714–735, May, 1993; Chang, G. K., et al, "Multiwavelength reconfigurable WDM/ATM/SONET network testbed," *J. of Lightwave Tech.,* vol. 14, pp. 1320–1340, June, 1996; Wagner, R. E., et al, "MONET: Multiwavelength optical networking," *IEEE J. of Lightwave Tech.,* Vol. 14, pp. 1349–1355, June, 1996.

Provisioning of a transport network refers to assigning network resources to a static traffic demand. Efficient provisioning is essential in minimizing the investment made on the network required to accommodate a given demand. In the context of WDM optical networks, provisioning means routing and wavelength selection for a set of end-to-end wavelength allocation demands, given a demand distribution and a network topology. Provisioning of WDM networks has been subject to considerable interest, concentrating primarily on two context categories. The first of these treats the case of limited deployed fiber, where provisioning seeks to minimize the number of required wavelengths. Such applications are described, e.g., in Chlamtac, I., A. Ganz, and G. Karmi, "Lightpath communications: An approach to high bandwidth optical WAN's," *IEEE Transactions on Communications,* Vol. 40, No. 7, pp. 1171–1182, July, 1992, and Nagatsu, N., Y. Hamazumi, and K. Sato, "Electronics and Communications in Japan," Part 1,Vol. 78, No. 9, pp. 1–11, Sept. 1995. The second case that has been treated in the prior art is that involving a limited number of wavelengths per fiber, where provisioning seeks to minimize the amount of required fiber. See, for example, Nagatsu, N., and K. Sato, "Optical path accommodation design enabling cross-connect system scale evaluation," *IEICE Trans. Commun.,* Vol. E78-B, No. 9, pp. 1339–1343, Sept., 1995; and Jeong, G. and E. Ayanoglu, "Comparison of wavelength-interchanging and wavelength-selective cross-connects in multiwavelength all-optical networks," *Proc. IEEE INFOCOM '96,* pp. 156–163, March, 1996.

Figure 1:
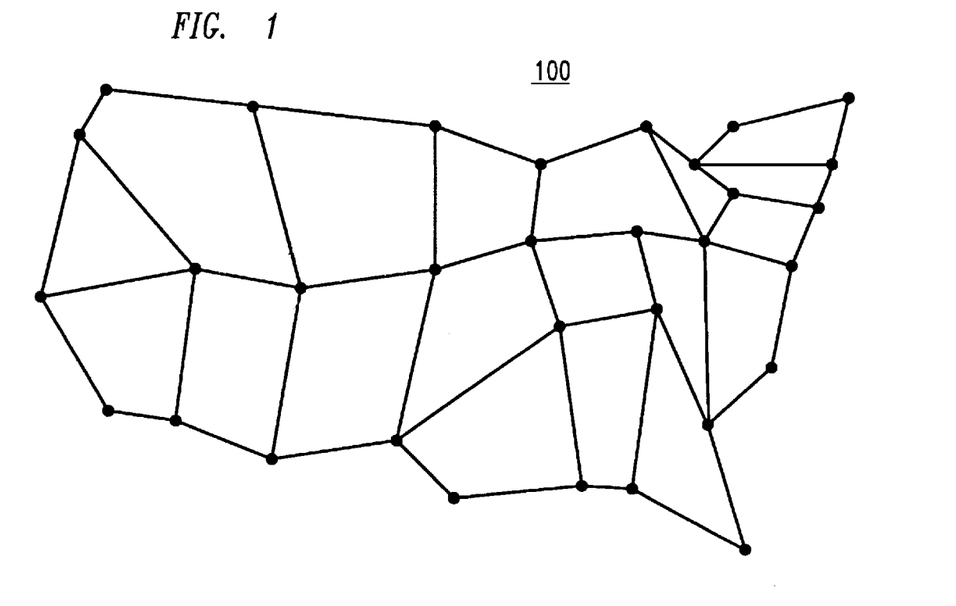
FIG. 1 is an illustrative network for which inventive provisioning solutions may be provided in accordance with illustrative embodiments of the present invention.

FIG. 1 shows a typical network 100 to which provisioning methods may be applied. There, a set of nodes is interconnected by a plurality of fiber links to form a network. It is assumed that each connection between any two nodes (not necessarily adjacent) requires a dedicated wavelength on each link of its path. The typical context assumes that there is a fixed set of wavelengths available on each fiber, and therefore the connections are established at the expense of possibly multiple fibers on network links. Each fiber has a cost reflecting the installed fiber material, optical amplifiers, and optical termination equipment at both ends of the link. The objective of provisioning is taken as the minimization of the total network cost. Most prior attempts at provisioning for networks of the type exemplified by the network of FIG. 1 have sought an optimal solution prescribing how such provisioning should be accomplished.

A first class of prior provisioning solutions is applied in networks that do not account for possible network failures. Such networks are called primary networks; the objective in primary-network design is to minimize the cost associated with the working fibers. This problem has typically been formulated as an integer linear program (ILP) in a straightforward manner. However, the computational complexity of such ILP solutions has proven to be prohibitive for a network whose size is not trivial.

Moreover, since transport networks are intended to carry high volumes of traffic, network failures can have severe consequences. This imposes fault-tolerance as an important feature for provisioning practical transport networks. Fault-tolerance refers to the ability of the network to reconfigure and reestablish communication upon failure, and is widely known as restoration. Restoration entails rerouting connections around failed components under a targeted time-to-restore. A network with restoration capability requires redundant capacity to be used in the case of failures. An important concern in designing and provisioning such networks is to provide robustness with minimal redundancy.

While design methods devised for conventional, single-wavelength restorable networks can be employed in WDM optical networks, such prior designs typically prescribe switching all wavelengths in a fiber together in the case of failure. WDM optical networking, however, provides the capability to switch individual wavelengths, thereby offering a richer set of design methods. Some attempts at employing this flexibility have been treated, for example, in Nagatsu, N., S. Okamoto, and K. Sato, "Optical path cross-connect scale evaluation using path accommodation design for restricted wavelength multiplexing," *IEEE JSAC,* Vol. 14, No. 5, pp. 893–901, June, 1996; Sato, K. and N. Nagatsu, "Failure restoration in photonic transport networks using optical paths," *Proc. of OFC '96,* pp. 215–216, March, 1996; and Wuttisittikuikij, L., and M. J. O'Mahony, "Use of spare wavelengths for traffic restoration in multi-wavelength transport network," *Proc. of ICC '95,* PP. 1779–1792, June, 1992.

Solutions for provisioning WDM networks with restoration have, nevertheless, proven complex and time consuming.

SUMMARY OF THE INVENTION

The limitations of the prior art are overcome and a technical advance is made in accordance with the present invention, several illustrative embodiments of which are presented in the following detailed description. In general, the present inventive method, in several embodiments, provides heuristic provisioning methods for a static set of connections on a given WDM optical network topology.

Efficient, lowered-cost networks result from the application of one or more of the design and implementation approaches and methods described herein. In typical realization, a network includes a plurality of interconnected nodes, each of which has some included switch-like functionality. For example, nodes may include wavelength selective cross-connects (WSXCs) for receiving one or more input fibers carrying signals at a plurality of wavelengths and delivering output signals to output fibers at corresponding wavelengths.

A first class of illustrative solutions relates to provisioning in primary networks. Efficient heuristic solutions are presented that produce low cost networks several orders of magnitude faster than general-purpose TIP packages. A second class of illustrative solutions adapts and extends the heuristic provisioning solutions used in primary networks for use in restorable networks.

In one aspect, pre-computed restoration solutions are developed in advance to provide for reactions of networks to certain types of failures. Then, upon occurrence of each failure one or more predetermined reconfiguration options are adopted. Particular illustrative types of heuristic solutions entail determining some or all reconfigurations simultaneously in a coordinated manner. This results in better designs compared to methods in which configurations are developed independently for each different failure.

While the disclosed embodiments are illustratively applied to wavelength-selective WDM optical networks—each connection is assumed to occupy the same wavelength on its entire path—the present inventive methods, and resulting network configurations, may be extended to networks in which an arbitrary subset of nodes have wavelength conversion capability.

BRIEF DESCRIPTION OF THE DRAWING

The present invention will be more fully understood upon consideration of the following detailed description in connection with the attached drawing, wherein.

DETAILED DESCRIPTION

Primary-network Design

Formulation of the primary-network design problem is initiated by providing some definitions which are used throughout the description. For purposes of illustration, a network is represented by an undirected, weighted graph G=(N, E, D). Here N denotes a set of nodes, E denotes a set of links, and D=(d(e): e ∈ E) denotes a set of positive link weights. In the illustrative applications, the weight of a link represents the cost per fiber deployed on the link. The set of wavelengths that are available on each fiber is identified by W. Given a link e, a path p, and a wavelength w, the pair (e,w) is called a lighthop, and the pair (p,w) is called a lightpath. Let U=N×N denote the set of node pairs in the network. The demand for the network is an integer vector $\delta=(\delta(u))$: U ∈ U where $\delta(u)$ denotes the number of connections to be established between the pair of nodes in u. It is assumed that in the primary network each such connection can only be routed on a path from a prespecified set of admissible paths, which is identified by P(u). If p ∈ P(u) and w ∈ W, then we call the pair (p,w) an admissible lightpath for the node pair u.

An assignment is defined as a real vector a=(a(p,w): p∈ P(u), U∈ U, W ∈ W) such that a≦0 and $\Sigma_{p\in P(u)} \Sigma_{w\in W}$ a(p,w)=$\delta$(u) for each u∈U. Under assignment a the load at lighthop (e, w), x(e, w), is expressed as $$x(e, w) = \sum_{u \in U} \sum_{p \in P(u): e \in P} a(p, w). \quad (2.1)$$

If the vector a is an integer assignment, then a(p,w) represents the number of connections that are assigned to the lightpath (p,w). Each such connection occupies the wavelength w on each link of the path p. Therefore, if the integer assignment a is adopted, then the number of fibers required at link e is given by $\max_{w \in W}$ x(e,w). The cost corresponding to a, J(a), is then defined as $$J(a) = \sum_{e \in E} d(e) \max_{w \in W} x(e, w).$$

The design problem considered in this section can then be stated: Given a network G, wavelength set W, demand $\delta$, and admissible paths (P(u):U ∈ U), the primary-network design problem, P, comprises assigning an admissible lightpath to each connection so as to minimize the resulting cost. Namely, P:min {J(a):a is an integer assignment}.

The problem P can easily be formulated as an integer linear problem (ILP) as follows:

min $\Sigma_{e \in E}$ d(e)k(e)

such that x(e, w)≦k(e) for each e∈E, w∈W, and a is an integer assignment.

Here (k (e):e ∈ E ) and (a(p,w):p ∈ P(u), U ∈ U, w ∈ W are variables, whereas (x(e,w):e ∈ E, W ∈ W) is determined by equality (2.1). Typical numbers of variables and constraints in the ILP formulation are listed in Table I for some mesh-like topologies of various sizes. In particular, Table 1 shows the size of the ILP formulation of the

TABLE 1

|  | Number of Nodes | | |
| --- | --- | --- | --- |
|  | 9 | 32 | 88 |
| Number of variables | 698 | 8,978 | 68,954 |
| Number of constraints | 340 | 1,888 | 11,884 | primary-network design problem for several mesh-like networks. In each case the number of wavelengths is 8 and the number of admissible paths per node pair is 2.

General purpose computer program codes for ILPs typically employ branch and bound techniques with linear programming relaxation. Such solution methods generally entail a very high computational complexity, even for moderate size networks, particularly if there is a large number of connections to be established. In view of this, illustrative embodiments of the present invention focus on heuristic solution methods.

It proves useful to briefly digress from primary-network design, to introduce a collection of auxiliary optimization problems which are parametrized by a positive scalar $\alpha$. These problems are related to the primary-network design problem P in that, as $\alpha$ grows larger, their cost functions converge to the function J. Proposition 2.1 provides a characterization of solutions to each auxiliary problem, which in turn proves useful in developing a heuristic solution method for problem P.

As with the primary-network problem, it proves useful to start with some definitions. Given a positive number $\alpha$, let $J^\alpha$ denote a cost function such that for each assignment a $$J^\alpha(a) = \alpha^{-1} \sum_{e \in E} d(e) \log \sum_{w \in W} \exp(\alpha x(e, w)).$$

Note that $$J^\alpha(a) = \sum_{e \in E} d(e) \max_{w \in W} x(e, w) + \alpha^{-1} \sum_{e \in E} d(e) \log \sum_{w \in W} \exp\left(\alpha\left(x(e, w) - \max_{w' \in W} x(e, w')\right)\right),$$

and therefore $$J(a) \leq J^\alpha(a) \leq J(a) + \alpha^{-1} \sum_{e \in E} d(e) \log |W|.$$

In particular $\lim_{\alpha \to \infty} J^\alpha(a) = J(a)$ uniformly for all assignments a. Finally, let the optimization problem $P^\alpha$ be defined as follows:

$P^\alpha$: min $\{J^\alpha(a)$: a is a real assignment$\}$.

Notice that in contrast to the problem P, solutions of $P^\alpha$ are not constrained to be integer-valued assignments.

Next studied are possible solutions of $P^\alpha$. Towards this end, note the differentiability of $J^\alpha$, and let $M^\alpha(p,w)$ denote its partial derivative with respect to a(p,w). Namely, given as assignment a with corresponding load x, $$M^\alpha(p, w) = \frac{\partial J^\alpha(a)}{\partial a(p, w)} \sum_{e \in E} d(e) \frac{\exp(\alpha x(e, w))}{\sum_{w' \in W} \exp(\alpha x(e, w'))}.$$

If (p,w) and (p', w') are admissible lightpaths for a node pair u such that a(p,w)>0 and $M^\alpha(p, w) > M^\alpha(p', w')$, then one can find a small, positive number $\sigma$ such that decreasing a(p,w) by $\sigma$ and increasing a(p', w') by $\sigma$ results in another assignment whose cost is strictly less than $J^\alpha(a)$. Thus if an assignment a is optimal for problem $P^\alpha$, then for each node pair u and each admissible lightpath (p,w) of u, a(p,w)=0 whenever $M^\alpha(p,w)$>min $\{M^\alpha(p',w'):(p',w')$ admissible for u$\}$.

The following proposition establishes that this condition is also sufficient for optimality in $P^\alpha$.

Proposition 2.1 It can be shown that there exists a solution to the problem $P^\alpha$. An assignment a solves $P^\alpha$ if and only if condition (2.2) holds for each node pair u and each admissible lightpath (p, w) of u.

Proposition 2.1 does not provide a constructive characterization for the solutions of problem $P^\alpha$. However, such solutions can be well approximated by employing steepest descent methods. In the context of optimal routing, such methods are referred to as flow deviation algorithms. In the present context, flow deviation entails identifying a lightpath that has the smallest partial derivative $M^\alpha$, and obtaining a better assignment by increasing the assignment on that lightpath by an appropriate value. In particular, one can employ a sequence of flow deviations to arrive at a real assignment that is near-optimal for problem $P^\alpha$. An approach to applying these techniques to Proposition 2.1 can be found in Bertsekas, D. and R. Gallager, *Data Networks,* Prentice-Hall, New Jersey, 1992, e.g., at Problem 5.31. Adaptations of such approaches will be used in the following section in developing a heuristic, iterative procedure to obtain good integer assignments for the original problem P.

Heuristic Design Algorithms

A heuristic solution method will now be described for the primary-network design problem. The method relies on a metric defined on the lightpaths of the network. Namely, given an assignment a with the corresponding load x, the lightpath-metric M(p, w) of a lightpath (p, w) is defined as $$M(p, w) = \sum_{e \in p} m(e, w),$$

where $$m(e, w) = \begin{cases} d(e)/n_e(a) & \text{if } x(e, w) = \max_{w' \in W} x(e, w') \\ \epsilon & \text{else} \end{cases}$$

where $\epsilon$ is a small, nonnegative number, and $n_e(a) = |\{w^* \in W : z(e,w^*) = \max_{w'} x(e,w')\}|$ is the number of wavelengths that have the maximum load on link e. Note that $$M(p, w) = \lim_{\alpha \to \infty} M^\alpha(p, w).$$

To facilitate the description of the algorithm it is convenient to identify each connection in the network separately. Towards this end, for each node pair u, let $\Delta(u)$ denote the set of connections to be established between the pair of nodes u. In particular $|\Delta(u)| = \delta(u)$. A configuration is defined as a mapping from the connections into the associated admissible lightpaths, and identifies a path and wavelength selection for each connection. Given a configuration, let p(c) and w (c) denote respectively the path and wavelength assigned to connection c. Also let the cumulative metric of the network denote the sum $\Sigma_{u \in U} \Sigma_{c \in \Delta(u)} M(p(c), w(c))$.

A configuration uniquely identifies an integer assignment a. We thus define the cost of a configuration as the cost J(a) of the corresponding assignment. Let x denote the load corresponding to a. A straightforward calculation yields $$\sum_{u \in U} \sum_{c \in \Delta(u)} M(p(c), w(c)) = \sum_{e \in E} \sum_{w \in W} x(e, w) m(e, w) \quad (2.3)$$

$$= \sum_{e \in E} d(e) \max_{w \in W} x(e, w)$$

$$= J(a);$$

hence the cost of a configuration is given by the cumulative metric of the network. This observation will now be used with the flow deviation approach described above to derive and apply a useful, easily applied heuristic method or algorithm.

Actual computer operations identified in the method steps will be carried out by any well-known general purpose computer having appropriate processing abilities, as will appear to those skilled in the art in light of complexity of particular network problems. In the sequel there will be presented descriptions of the processing steps that will enable those skilled in the art to realize computer program codes appropriate to particular contexts and facilities, such as particular machines, computer languages and the like.

Figure 2:
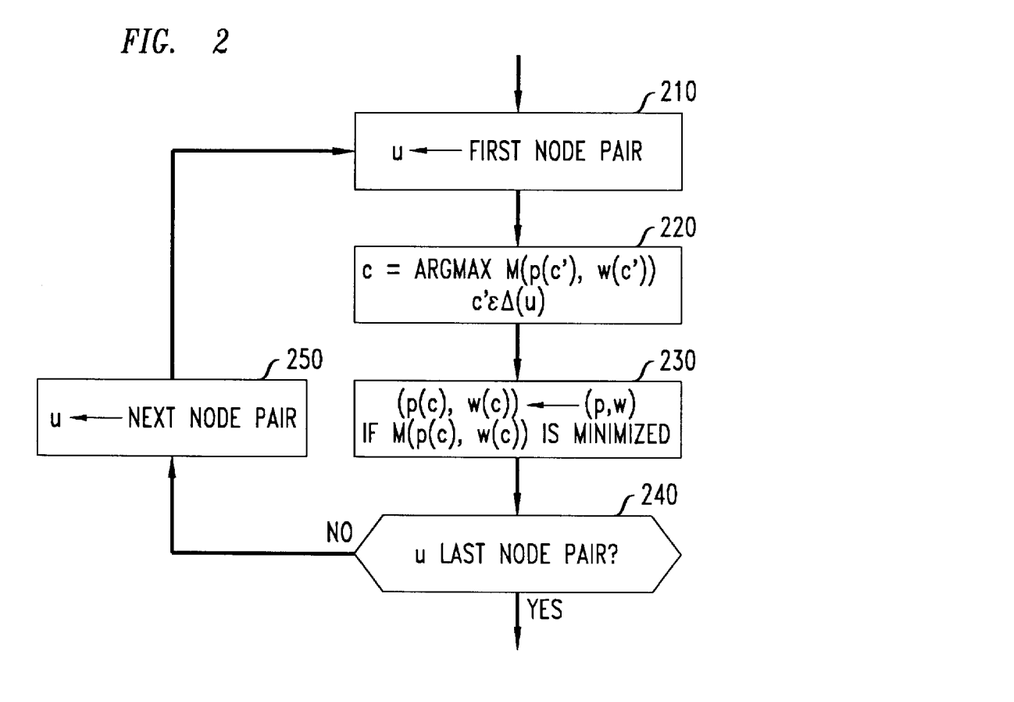
FIG. 2 is a flowchart illustrating one iteration in a method for provisioning a primary network configuration in accordance with one aspect of the present invention.

An illustrative algorithm embodiment starts with an arbitrary initial configuration and iteratively computes new configurations until a certain stopping criterion is fulfilled. An iteration involves one decision relative to each node pair. Namely, for each node pair u, a connection $c \in \Delta(u)$ is determined that maximizes the lightpath-metric M(p(c), w (c)) in the current configuration. A new configuration is then obtained by setting (p(c), w (c))=(p, w), where (p, w) is an admissible lightpath for u such that the lightpath metric M(p(c), w (c)) is minimized under the resulting configuration. It proves convenient to sometimes express operations such as "determining a connection between a node pair" in terms of the actions or observations of the node pair, as in "the node pair determines a connection $c \in \Delta(u) \ldots$" It will be understood that these operations are typically performed at a single processing location, but relate to characteristics, performance and the like at the actual network nodes. The flowchart of an iteration is given in FIG. 2. The output of the algorithm is a configuration that achieves the smallest cost in the course of the iterations. Method steps 210, 220, 230,240 and 250 are readily identified with the operations described above.

Figure 3:
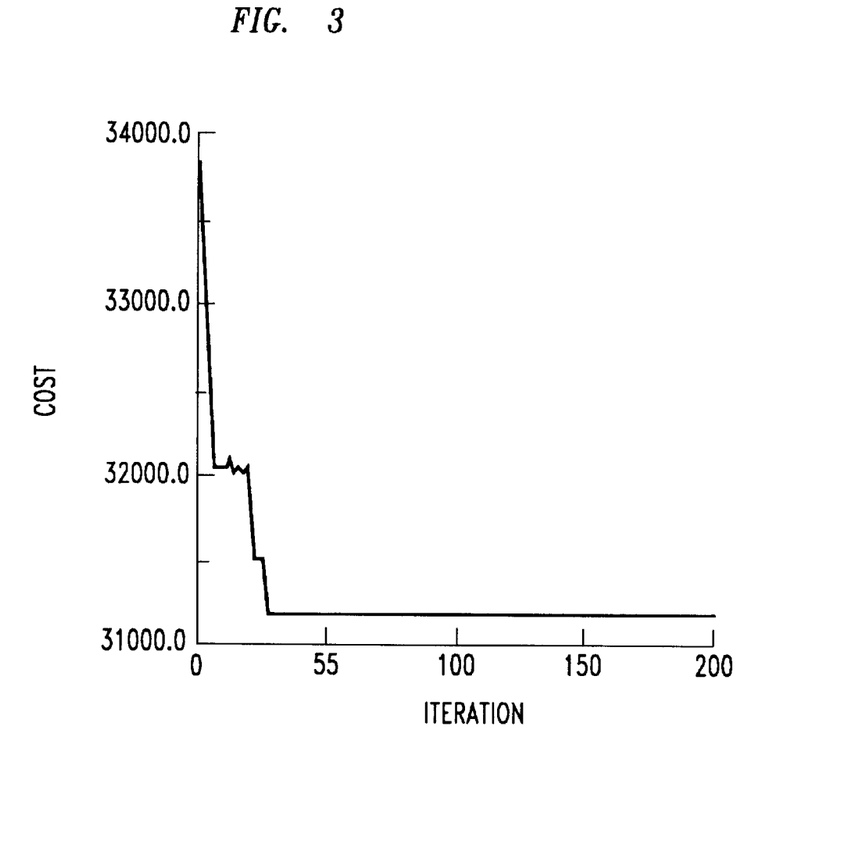
FIG. 3 is a chart illustrating typical cost variation as a function of the number of iterations in an illustrative provisioning method.
Figure 5:
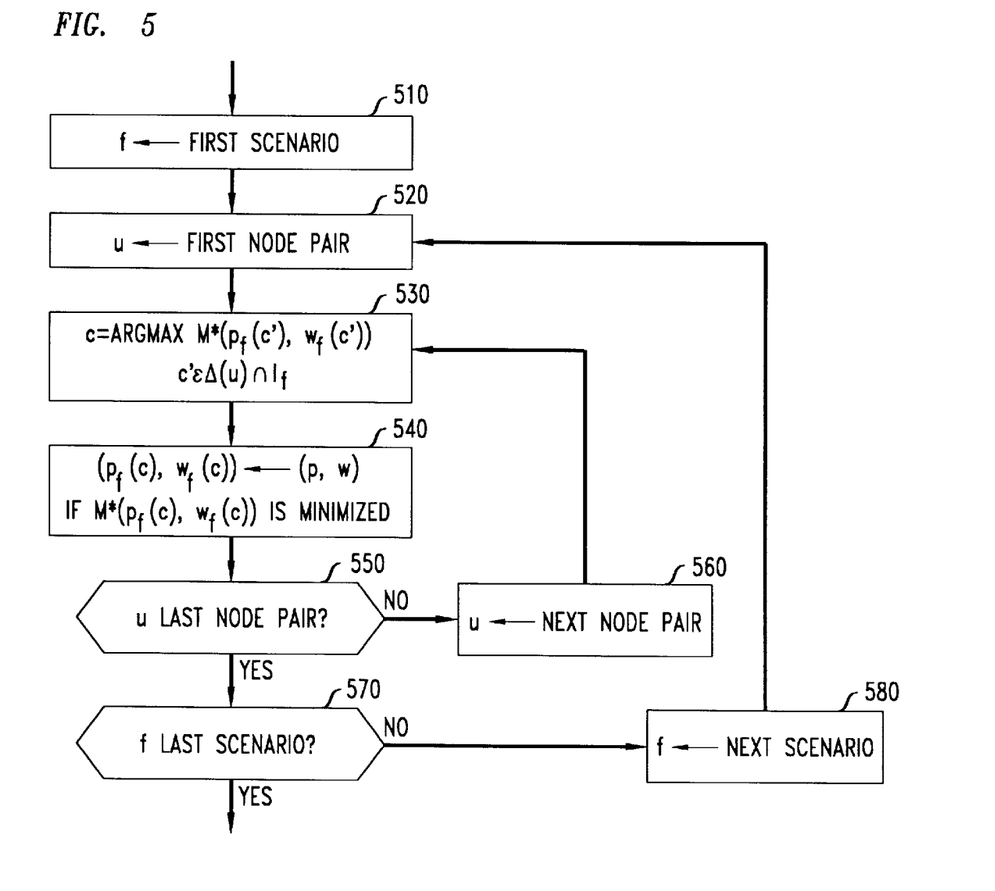
FIG. 5 is a flowchart of an illustrative restorable-network provisioning method in accordance with one aspect of the present invention.

During the execution of the preceding illustrative algorithm, node pairs greedily attempt to decrease the maximum lightpath-metric observed by their connections. While in view of identity (2.3) such an effort may be expected to decrease the cost, it may as well increase the cost by sufficiently increasing the lightpath-metrics observed by unmodified connections. Thus the cost is not necessarily monotone with respect to the iterations. However, increasing the capacity requirement at a link typically increases the number of lighthops (e, w) such that, m(e, w)=0, thereby possibly helping the next iteration obtain a smaller cost. Intuitively, the network cost is likely to have negative drift if it is too high. A typical variation of the network cost with iteration number is plotted in FIG. 3. There, the initial configuration is also constructed with the same heuristic. It has been found that the highly efficient methods for achieving a reduced cost solution (e.g., shown in FIGS. 2 and 5 and described herein) are achieved after a large number of iterations, in which the cost does not change for a number of iterations. The example shown in FIG. 3 is merely illustrative.

The computational complexity per iteration of the algorithm is linear in the total number of connections and in the total number of admissible lightpaths. As described below, algorithms based on the foregoing inventive principles typically produce good configurations in a small number of iterations, thus providing a fast, suboptimal alternative to the integer programming approach.

Alternative Metrics

Variations of the heuristic approach presented in the preceding section may be obtained by adopting a different lightpath-metric in the algorithm described in that section. In this section the five variations listed in Table 2 will be discussed.

TABLE 2

| Algorithm | Lightpath-metric of (p,w) |
|---|---|
| Min normalized sum (mNS) | $M_{mNS}(p,w) = \Sigma_{e \in p} x(e,w)/\max_{w' \in W} x(e,w')$ |
| Min normalized product (mNP) | $M_{mNP}(p,w) = \Sigma_{e \in p} \log(x(e,w)/\Sigma_{w' \in W} x(e,w'))$ |
| Max residual capacity (MRC) | $M_{mrc}(p,w) = \Sigma_{e \in p}(x(e,w) - \max_{w' \in W} x(e,w'))$ |
| Max normalized res.cap. (MNRC) | $M_{MNRC}(p,w) = \Sigma_{e \in p}((x(e,w)/\max_{w' \in W} x(e,w'))-1)$ |
| Max residual capacity (MmRC) | $M_{MmRC}(p,w) = -\min_{e \in p}(\max_{w' \in W} X(e,w') - x(e,w))$ |

Dynamic versions of these algorithms have been considered in certain network management settings, it is thus of interest to see their performances in the primary-network design problem A few preliminary observations prove helpful:

(i) Since $\max_{w' \in W} x(e,w')$ denotes the capacity requirement of link e, the mNS algorithm of Table 2 tends to reroute connections on lightpaths whose lighthops are lightly loaded, is likely to result in a high wavelength utilization on each link of the network. A straightforward calculation yields the cumulative (mNS) metric of a configuration is given by:

$$\sum_{u \in U} \sum_{c \in \Delta(u)} M_{mNS}(p(c), w(c)) =$$

$$\sum_{e \in E} \max_{w' \in W} x(e, w') \sum_{w \in W} \left( x(e, w) / \max_{w' \in W} x(e, w') \right)^2$$

Hence, roughly speaking, minimizing the cumulative metric entails equalizing the loads on the lighthops of each link, as well as minimizing the total capacity requirement.

(ii) While the mNP algorithm favors lightpaths with lightly-loaded lighthops, it may also favor long lightpaths. Define $H(e) = \Sigma_{w \in W} (x(e,w)/\Sigma_{w' \in W} x(e, w')) \log(x(e, w) \Sigma_{w' \in W} x(e, w'))$ for each link e, so that $\Sigma_{u \in u} \Sigma_{c \in \Delta(u)} M_{mNP}(p(c), w(c)) = \Sigma_{e \in E}(\Sigma_{w' \in W} x(e,w')) H(e)$.

Note that minimizing the cumulative metric of the network entails a high wavelength utilization, so that H(e) is small, typically a high capacity requirement, since H(e) is non-positive.

(iii) The MRC algorithm also may favor long lightpaths of lightly-loaded lighthops.

The cumulative metric of this algorithm is given by $\Sigma_{e \in E} \Sigma_{w \in W} x(e,w) (x(e,w) - \max_{w' \in W} x(e,w'))$, hence its minimization may imply a high capacity requirement since x(e, w)-$\max_{w' \in W} x(e, w')$ is nonpositive. Note that these observations apply to the MNRC algorithm as well.

(iv) The MmRC algorithm reassigns connections so as to avoid bottleneck lighthops; it is known to be effective in dynamic settings.

On the premise that iterations tend to cluster around configurations that minimize the cumulative metric of the network, one may expect the algorithm mNS to perform well, whereas algorithms nNP, MRC, and MNRC may be expected to yield a high network cost, despite a good wavelength utilization. This intuition is supported by a numerical evaluation of the algorithms which is provided below.

Restorable-network Design

This section is concerned with the provisioning of networks that have restoration capability. The aim of the provisioning methods considered here is to minimize the network cost while providing sufficient capacity to guarantee network robustness against a specified set of failures. We consider the case when a primary-network configuration is fixed in advance, and provide that, upon each failure, connections are sustained by adopting a predetermined reconfiguration. We introduce two heuristic methods to obtain such reconfigurations. The performance of these methods is evaluated below. In applying both the primary network configuration and one or more predetermined reconfigurations in accordance with the present inventive embodiments, standard switching and cross connect techniques are applied using the configuration direction of the inventive method embodiments. In particular, so-called wavelength selective cross connects (WSXCs) as described, e.g., in the Jeong and Ayanoglu paper cited above are typical systems used in realizing configured networks. Other aspects of primary-network and restorable-network structures will be discussed below in connection with FIGS. 6 and 7.

Again, a number of definitions are helpful in the formulation of the design problem. Suppose that a primary-network configuration is given, so that under normal operation conditions (i.e. no failures) the lightpath assignment of each connection is known. A failure scenario is defined as a collection of failed network components. Here a network component may denote a link or a node. The set of connections that are allowed to be reconfigured upon a failure scenario $f$ is referred to as the impact set of the failure scenario, and is denoted by $I_f$. This set is a design variable, but it necessarily includes the connections that utilize at least one of the failed components in the primary-network configuration. Larger impact sets yield more efficient designs at the expense of larger restoration time and complexity. Upon failure scenario $f$, each connection $c$ in the impact set $I_f$ is reassigned a lightpath from the set of restoration paths for $c$, denoted by $P_f(c)$. Naturally, the paths in the set $P_f(c)$ may not utilize any of the components in the failure scenario $f$. This set also takes on different forms for link-based and path-based restoration schemes, as explained in further detail below. Finally, a reconfiguration for the failure scenario $f$ refers to a lightpath assignment in which the connections in the impact set $I_f$ are assigned restoration paths, whereas the remaining connections retain the same lightpaths as in the primary-network configuration.

Each reconfiguration identifies an integer vector on the lightpaths of the network. We now provide a description of this vector, which will be useful in the formulation of the problem. Consider a reconfiguration for failure scenario $f$, and let $a_f(p,w)$ denote the number of connections assigned to lightpath $(p,w)$. Also let $b_f(p,w)$ be the number of connections that are assigned the lightpath $(p,w)$ in the primary-network configuration, that do not belong to the impact set $I_f$. Note that each such connection is to be assigned the same lightpath in the reconfiguration, therefore $a_f(p,w) \geq b_f(p,w)$. For each node pair u, let $P_f(u) = U_{c \in \Delta(u)} \cap_{If} P_f(c)$ denote the restoration paths associated with u. The total number of connections on these paths is no less than the number of reconfigured connections, therefore $\Sigma_{p \in P_f^{(u)}} \Sigma_{w \in W} a_f(p,w) \geq |\Delta(u) \cap I_f|$ for $u \in U$. Finally, the reconfiguration should satisfy the demand, and thus $\Sigma_{p \in P(u) \cup P_f^{(u)}} \Sigma_{w \in W} a_f(p,w) = \delta(u)$. An integer vector which satisfies the above conditions is called a reassignment for failure scenario $f$. Note also that a reconfiguration can easily be constructed from such a vector.

Design of a restorable network entails determining reassignments for a collection of envisioned failure scenarios. Let F be such a collection. A set $A_F = (a_f : f \in F)$ of one admissible assignment for each failure scenario in F is called a restoration program for F. A restoration program identifies a reconfiguration to be adopted upon each failure scenario. Let x denote the load corresponding to the primary-network configuration, and for each $f \in F$, let $x_f$ denote the load under reassignment of $a_f$. For each lighthop (e, w), define $x^*$ (e, w)=max $\{x(e, w), \max_{f \in F} x_f (e, w)\}$. Note that if restoration program $A_F$ is adopted, then the minimum capacity requirement at a link e is $\max_{w \in W} x^*$ (e, w), so that all connections are guaranteed connectivity under at most one failure scenario from F. The cost of the restoration program $A_F$ is now defined as $$J^*(A_F) = \sum_{e \in E} d(e) \max_{w \in W} x^*(e, w).$$

Given a primary-network configuration, a collection of failure scenarios F, impact sets $(I_f : f \in F)$, and restoration paths $(P_f(c) : f \in F, c \in I_f)$, we define the restorable-network design problem, R, as follows:

R:min$\{J^* (A_F): A_F$ is a restoration program$\}$.

The problem R admits the following ILP formulation.

min $\Sigma_{e \in E} d(e) \kappa(e)$ such that $x(e, w) \leq \kappa(e)$ for each $e \in E$, $w \in W$ $x_f(e, w) \leq \kappa(e)$ for each $e \in E$, $w \in W$, $f \in F$.

$a_f$ is an admissible integer reassignment for each $f \in F$. In addition to the size of the network, the complexity of the above ILP depends on the number of failure scenarios and the size of the associated impact sets. In typical applications each link failure is considered as a possible failure scenario, and the size of the RIP is typically large enough to necessitate fast and suboptimal heuristic solution methods. Two such methods are considered next, and their performances are compared in a following section.

Method of Independent Designs

One heuristic solution for problem R entails decoupling the problem into |F| independent network design problems, one for each failure scenario $f \in F$. In particular, for each failure scenario $f$, one adopts an admissible assignment that would be optimal in the case $F=\{f\}$. Namely, the method of independent designs prescribes the restoration program $(a^*_f : f \in F)$, where $a^*_f$ denotes a solution for the following ILP:

min $\Sigma_{e \in E} d(e) \kappa(e)$ such that $x(e,w) \leq \kappa(e)$ for each $e \in E$, $w \in W$ $x_f(e,w) \leq \kappa(e)$ for each $e \in E$, $w \in W$, $a_f$ is an admissible integer assignment for $f$.

Figure 4:
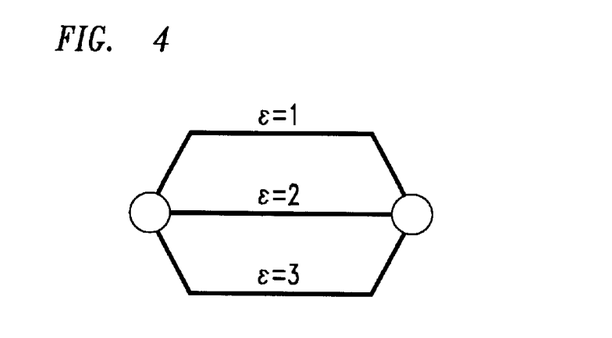
FIG. 4 is a portion of an illustrative network useful in evaluating the effect of faults in restorable network provisioning methods.

If the size of each impact set is small relative to the total number of connections, then the method of independent designs results in significant reduction in computational complexity. This method, however, is clearly suboptimal: Since the assignments $(a^*_f : f \in F)$, are obtained in an oblivious fashion, it may lead to restoration programs with high redundant capacity and thus high cost. To illustrate this using an example, consider the topology of FIG. 4 where F consists of the three single link failures. Assume that the number of wavelengths is 8, and 24 connections are to be established between the two nodes, so that an optimal primary-network design yields one fiber per link. For definitiveness, assume also that the impact set of a failure is the set of connections on the associated link. The method of independent designs may conceivably result in one redundant fiber on each link, whereas it actually suffices to have one redundant fiber on only two of these links. This observation motivates coordinated heuristic design methods, one of which is the subject of the following section.

Heuristic algorithm for coordinated designs

An adaptation of the primary-network design algorithm presented above provides an approximate solution method for the restorable- network design problem. Description of the method relies on a metric defined for each lightpath in the network. Namely, given a restoration scheme $A_F$, the metric $M^*$ (p, w) of a lightpath (p, w) is defined as $$M^*(p, w) = \sum_{e \in p} m^*(e, w),$$

where $$m^*(e, w) = \begin{cases} d(e)/n_e^*(A_F) & \text{if } x(e, w)^* = \max_{w' \in W} x^*(e, w') \\ 0 & \text{else,} \end{cases} \quad (3.1).$$

and $n^*_e(A_F) = |\{\tilde{w} \in W : x^*(e,\tilde{w}) = \max_{w'} x^*(e,w')\}|$. Note than $n^*_e(A_F)$ is the number of wavelengths on link e that would become fully loaded under some failure scenario $f \in F$, provided that the restoration program $A_F$ is adopted.

A heuristic coordinated designs algorithm will now be described which maintains one reconfiguration for each failure scenario. The pair $(p_f(c), w_f(c))$ denotes the lightpath assignment of connection c in the current reconfiguration for failure scenario $f$. All reconfigurations are initially set equal to the primary network configuration. The algorithm then iteratively computes a sequence of restoration programs, until a certain stopping criterion is satisfied. An iteration of the algorithm involves consideration of failure scenarios in a particular order. For each failure scenario $f$, one decision is executed by each node pair: viz., node pair u identifies a connection $c \in \Delta(u) \cap I_f$ that maximizes the metric $M^*(p_f(c), w_f(c))$, and then reroutes that connection by choosing a restoration path in $P_f(c)$ and a wavelength in W so that $M^*(p_f(c), w_f(c))$, is minimized under the resulting restoration program. The flowchart of the algorithm is given in FIG. 5. The output of the algorithm is a set of restoration directions (a restoration program) that achieves the smallest cost in the course of the iterations. Note that the metric of a lightpath is determined by all assignments in the current restoration program. In turn, developments of distinct reconfigurations are coupled with each other.

At any stage of the algorithm the quantity $\max_{x \in W} x^*(e, w)$ denotes the capacity requirement of link e under the current restoration program. By definition (3.1) a lighthop contributes to the lightpath metric only if there is a failure scenario under which the lighthop is fully loaded. Therefore, when rerouting a connection, the algorithm seeks to avoid such lighthops if possible, and thereby does not promote increasing the capacity requirement of the network. Furthermore, if a lighthop is fully loaded under some failure scenario, then its contribution is inversely proportional to the number of such lighthops on the same link; thus the lightpath selection also promotes high wavelength utilization. Note that in the example of FIG. 4 the algorithm finds the optimal solution in one iteration. On the other hand, one can imagine cases in which the rerouting decision taken by the algorithm entails a capacity increase at some links, hence increase of cost, although this is not absolutely necessary. Such decisions typically increase the number of lighthops (e, w) such that $m^*$ (e, w)=0, thereby help the next rerouting decision result in a smaller cost. The algorithm typically performs significantly better than the method of independent designs.

Physical Network Provisioning

Figure 6:
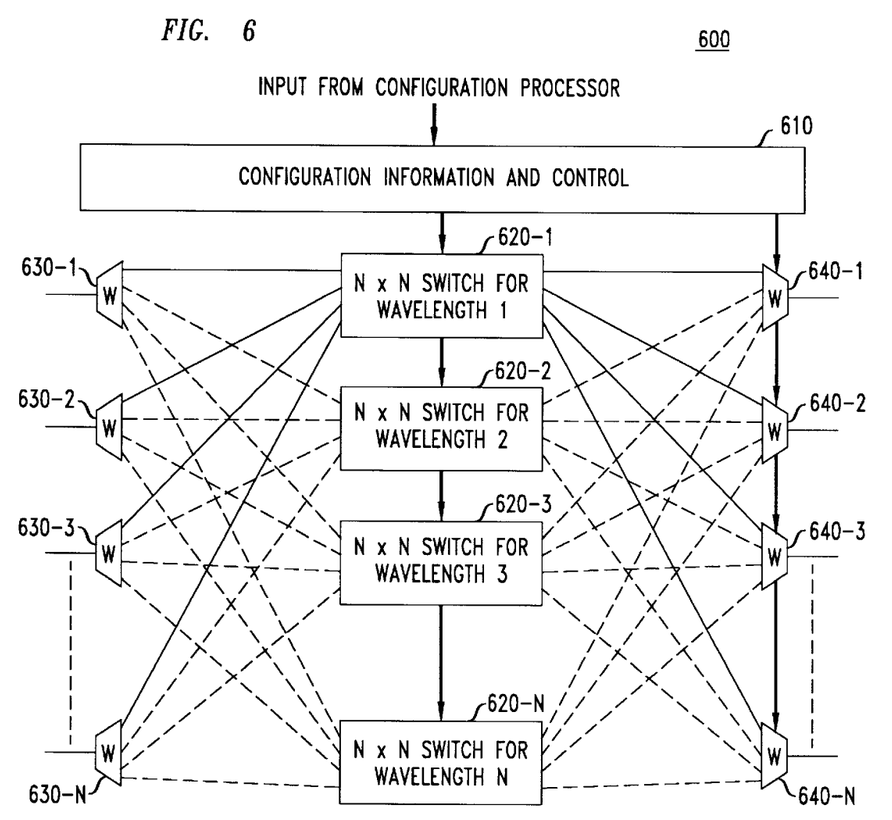
FIG. 6 shows a node configuration including a wavelength selective cross-connect (WSXC) operating under configuration direction from a network configuration processor.

As noted above, wavelength selective cross connect (WSXC) structures prove useful in physically realizing configurable and reconfigurable networks in accordance with the present inventive design and configuration methods. An illustrative WSXC arrangement suitable for location at a network node is shown in FIG. 6.

Similar to the use in time-division multiplex (TDM) networks of switches having time-space-time (TST) structures, WDM switching can be accomplished by means of wavelength-space-wavelength (WSW) structures. In these WSW structures, the first W stage demultiplexes signals on each incoming fiber into constituent wavelengths, the S stage performs space switching for each wavelength, and the second W stage multiplexes output wavelengths into different fibers. Demultiplexing and multiplexing wavelengths is a relatively simple task, various structures for this purpose are well known and are used, e.g., in wavelengths add-drop multiplexers (WADMs).

A variety of network elements for space switching of wavelengths (e.g., wavelength routers) is also well known. One such structure is obtained by using a layered switch with $LiNbO_3$ technology, as described, e.g., in Dragone, C., C. A. Edwards, and R. C. Kistler, "Integrated optics N×N multiplexer on Silicon," *IEEE Photonics Technology Letters*, Vol. 3, pp. 896–899, October 1991.

Other, more complex, switching structures can also be used to provide wavelength switching. For example, if the wavelength routers used in the WSXC structure of FIG. 6 are replaced with routers that can change wavelengths during the routing process, a Wavelength Interchanging Cross-Connect (WIXC) is realized. Such structures and classifications of their functionalities are described, e.g., in Yoo, S. J. B., "Wavelength conversion technologies for WDM network applications," *IEEE Journal of Lightwave Technology Letters*, vol. 3, pp. 896–899, October, 1991 and Yoo, S. J. B., C. Caneau, A. Rajhel, J. Ringo, R. Bhat, M. A. Koza, M. Amersfoort, J. Baran, K. Bala, N. Antoniades, and G. Ellinas, in an unpublished MONET Performance Milestone Report, March, 1997.

In the block diagram of a WSXC switching element 600 shown in FIG. 6, input demultiplexers 630-i, i=1, ..., N receive lightwave signals on their respective inputs 1, ..., N and demultiplex the component wavelengths for switching by respective space division switches 620-i, i=1, ..., W. Each of the switches 620 switches signals at a particular wavelength and outputs signals to multiplexers 640-i, i=1, ..., N. The outputs of multiplexers 640 are typically connected to other nodes in a network, such as that shown in FIG. 7.

In the switching arrangement of FIG. 6, configuration information, including directions to connect particular inputs to particular outputs, is provided by configuration information and control element 610. Element 610 typically includes storage of directions for interconnections for a primary network configuration as well as one or more restoration configurations. These directions are typically imposed by centralized or distributed provisioning computers on the switching components upon initial setup of the network configuration and as failure conditions may develop during network use. Particulars of the form of the direction and the manner of storing such directions will vary with the particular components to be configured at a node to contribute to the overall network configuration. A useful reference for restoration and management control in optical networks is Li, C. S., and R. Ramaswami, "Automatic fault detection, isolation, and recovery in transparent all-optical networks," Journal of Lightwave Technology, vol. 15, pp. 1784–1793, Oct. 1997.

Directions used at each node are advantageously formulated in accordance with one or more of the network configuration methods described above. Network operators will select the extent to which particular restoration techniques are to be applied, and the corresponding extent of restoration configuration directions to be stored at each node. The illustrative network shown in FIG. 7 includes a plurality of WSXC nodes 710 interconnected by solid-line datalinks and operating under the control of directions for each WSXC received over control paths (shown as broken lines in FIG. 7). The control information is illustratively shown as being provided by a common processor 700 executing the methods described above and illustrated in the drawing. It will be understood by those skilled in the art that the communication of configuration directions to the individual WSXC elements may be accomplished using the normal datalinks of the network, or may be communicated over separate control paths, as suggested by the broken line connections of FIG. 7. In other particular applications, each node may include a processor for contributing part or all of a solution to one or more of the primary-network or restorable-network configurations. In this latter case the need to communicate configuration directions can be reduced.

Figure 7:
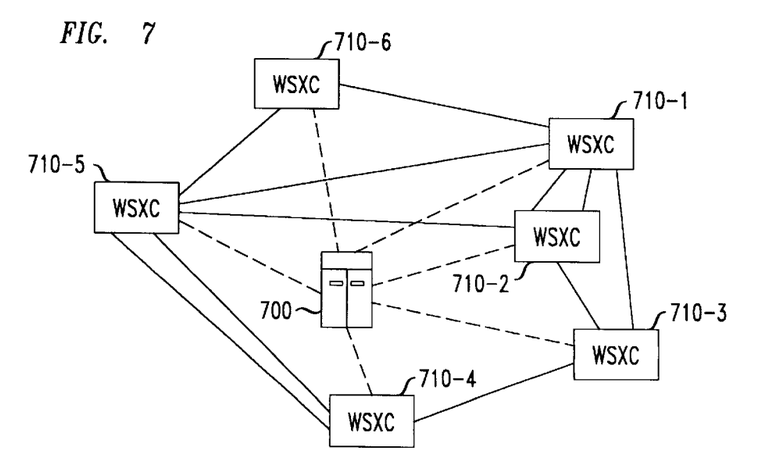
FIG. 7 shows a network with a plurality of WSXCs under the control of a centralized configuration processor.

In normal operation of a network like that shown in FIG. 7 or in other networks, e.g., that shown in FIG. 1, the operation of the switching elements at the nodes and consequent network configuration is controlled in accordance with directions corresponding to the primary network configuration as determined by the inventive methods described above. Upon occurrence of one or more failure conditions, configurations based on directions derived from use of one or more of the restoration programs described above will replace the primary network configuration. Because these directions for restoration are advantageously stored at each node, the restoration can be effected very quickly upon the occurrence of failure conditions.

Some Quantitative Results

This section focuses on some performance aspects of typical applications of the heuristic algorithms introduced above. In particular, the network topology of FIG. 1 is considered. The heuristic primary-network design algorithm is compared with the optimal solution as well as a commercially available, general purpose heuristic algorithm for solving linear integer problems. The lightpath metric variations introduced in Table 2 and the related discussion are also evaluated. Finally the performance of two restorable-network design algorithms discussed above are considered under several restoration schemes.

The illustrative network of FIG. 1 comprises 32 nodes and 50 links. The weight of each link is taken as the distance of the link, hence the objective of the design problem is to minimize the total fibermiles in the network. The number of wavelengths per fiber, $|W|$, is 8. The number of admissible paths is identical for each node pair, and is denoted by k. The set of admissible paths is taken as the first k shortest paths.

The optimal cost and the cost obtained by the illustrative heuristic primary-network design algorithm described above are given in Table 3, for several values of k. Here, a total of 200 connections are established in the network. In all cases the heuristic solutions are obtained within 200 iterations, and the optimal solution is calculated via the CPLEX software package marketed by CPLEX Optimization Inc., NV, USA. For k=1 the optimal solution was obtained in 355 (cpu) seconds on a Sparc20 workstation. For k=2 and k=3 the optimal solution could not be obtained within a week; therefore only upper and lower bounds, provided by the same package, are provided for these cases. For k=2 an integer assignment with cost 30,160 was obtained in a few hours, and for k=3 an integer assignment with cost 44,335 was obtained in a day. Since the integer assignment obtained for the case k=2 is also admissible for the case k=3, the value 30,160 is registered as an upper bound for the latter case in Table 3. The corresponding heuristic solutions were obtained in roughly k×8 (cpu) seconds. Thus, it can be seen that the heuristic algorithm, in typical application, runs orders of magnitude faster than the optimal algorithm.

The value of the optimal solution is minimal in the case k=∞, when any path connecting a given pair of nodes is admissible for that pair. While this case entails a high complexity for the ILP formulation, it can be handled efficiently by a simple variation of the heuristic algorithm. In particular each selected connection is first removed front the network, then an admissible lightpath that has the minimum metric is found via Dijkstra's shortest path algorithm, and finally the connection is rerouted on that lightpath. The last row of Table 3 gives the value obtained by this approach, which was calculated in 420 (cpu) seconds.

TABLE 3

|  | Optimal | | Heuristic | | Disparity |
|---|---|---|---|---|---|
|  | cost | time | cost | time | in cost |
| k = 1 | 34,970 | 355 sec | 34,970 | 8 sec | 0% |
| k = 2 | 29,300≦ ≦30,160 | ~hours | 31,240 | 16 sec | 3%≦ ≦8% |
| k = 3 | 27,160≦ ≦30,160 | ~day | 31,460 | 24 sec | 4%≦ ≦16% |
| k = ∞ | — | — | 30,460 | 420 sec | — |

In the heuristic algorithm., a lighthop contributes to a lightpath-metric only if it achieves the maximum load on the associated link. Configurations may occur in which connections are routed over a large number of hops, yet it is undesirable for any one connection to change its lightpath. To avoid such high-cost fixed points it is reasonable to modify the metric M by setting $$m(e, w) = \begin{cases} d(e)/n_e(a) & \text{if } x(e, w) = \max_{w' \in W} x(e, w') \\ \epsilon & \text{else,} \end{cases}$$

for a small positive $\epsilon$, or to replace M by $M^\alpha$ for a suitably large value of $\alpha$. Although such fixed points did not arise in the simulations, the described modifications resulted in up to 5% cost improvement, particularly for large values of k.

If the primary-network design algorithm presented above is compared to a general purpose heuristic solution method provided in the above-cited CPLEX package the present methods again prove highly advantageous.

The remainder of this section will focus on performance aspects of designs of restorable networks. Three different restoration schemes are considered for these networks: In the full-reconfiguration scheme all connections are allowed to be reconfigured upon a failure, whereas in the path-based and link-based restoration schemes a connection can be reconfigured only if it uses failed components in the primary-network configuration. In full-reconfiguration and path-based schemes a reconfigured connection is assigned to one of the k shortest paths in the faulty network. In the link-based scheme such a connection retains the functional segment of its original lightpath, and bypasses each failed network component by using one of the k appropriate shortest paths.

TABLE 4

|                     | independent | coordinated |
|---------------------|-------------|-------------|
| full-reconfiguration | 0.92        | 0.70        |
| path-based          | 1.01        | 0.87        |
| link-based          | 1.43        | 1.23        |

We now provide a numerical comparison of two restorable-network design algorithms introduced above. In the simulations the set of failure scenarios, F, is taken to be the set of all single-ink failures, and the three restoration schemes of the previous paragraph are considered. The primary-network heuristic algorithm presented above is employed to obtain the primary-network configuration, as well as each individual configuration in the method of independent designs. The ratio of the redundant fiber-miles to the working fiber-miles obtained in each case is reported in Table 4. In particular, Table 4 shows total redundant capacity (in fiber-miles) normalized by dividing with the total working capacity (in fiber-miles), under the considered restoration schemes and indicated design algorithms. Note that the primary-network design, hence the working fiber-miles, is identical in all considered cases. Here a total of 200 connections are established, and k=2. The full-reconfiguration and link-based schemes required, respectively, the least and most fiber-miles, and the coordinated heuristic resulted in roughly 20% savings in spare capacity in each case.

What is claimed is:

1. A communications network comprising processor means; a plurality of nodes; and a plurality of optical fiber links, each of said optical fiber links comprising means for transporting data on a plurality of channels, each of said channels characterized by a wavelength, w; node pairs, u, being selectively connected by a lightpath having a cost and comprising a channel in at least one of said links, each said lightpath having a common wavelength in each included link; the set of connections establishing a lightpath between pairs of said nodes to meet a defined data communications load, $\delta(u)$, being $\Delta(u)$, where $|\Delta(u)|=\delta(u)$; said connections being established by said nodes in response to a set of configuration signals determined in said processor means from among admissible lightpaths, thereby to reduce the overall cost of establishing said lightpaths in meeting $\delta(u)$; said processor means determining said configuration signals by starting with an arbitrary set of configuration signals (p, w) and iteratively performing the steps for each node pair, u, determining a connection, $c \in \Delta(u)$ that maximizes a lightpath-metric associated with the current configuration signals, and forming new configuration signals by setting (p(c), w(c))= (p, w), where (p, w) is an admissible lightpath for u such that the lightpath metric is minimized, until a predetermined stopping criterion is fulfilled, and then selecting the connections yielding the lowest cost.

2. The network of claim 1, wherein each of said nodes further comprises a memory at each node for storing said configuration signals, and switching means for establishing connections as directed by said configuration signals stored in said memory.

3. The network of claim 1, wherein said lightpath metric associated with said current configuration is given by $$M(p, w) = \sum_{e \in p} m(e, w),$$

where $$m(e, w) = \begin{cases} d(e)/n_e(a) & \text{if } x(e, w) = \max_{w' \in W} x(e, w') \\ \epsilon & \text{else} \end{cases}$$

where $\epsilon$ is a small nonnegative number, and $n_e(a)=|\{w^* \in W : x(e, w^*) = \max_{w'} x(e, w')\}|$ is the number of wavelengths that have the maximum load on link e.

4. The network of claim 1, wherein said lightpath metric associated with said current configuration is the minimum normalized sum (mNS) given by $$M_{mNS}(p,w) = \Sigma_{e \in p} x(e,w)/\max_{w' \in W} x(e,w').$$

5. The network of claim 1, wherein said lightpath metric associated with said current configuration is the minimum normalized product (mNP) given by $$M_{mNP}(p,w) = \Sigma_{e \in p} \log(x(e,w)/\Sigma_{w' \in W} x(e,w')).$$

6. The network of claim 1, wherein said lightpath metric associated with said current configuration is the maximum residual capacity (MRC) given by $$M_{MRC}(p,w) = \Sigma_{e \in p}(x(e,w) - \max_{w' \in W} x(e,w')).$$

7. The network of claim 1, wherein said lightpath metric associated with said current configuration is the maximum normalized residual capacity (MNRC) given by $$M_{MNRC}(p,w) = \Sigma_{e \in p}((x(e,w)/\max_{w' \in W} x(e,w')) - 1.$$

8. The network of claim 1, wherein said lightpath metric associated with said current configuration is the maximum residual capacity (MmRC) given by $$M_{MmRC}(p,w) = \min_{e \in p}(\max_{w' \in W} x(e,w') - x(e,w)).$$

* * * * *